United States Patent Office 2,777,565
Patented Jan. 15, 1957

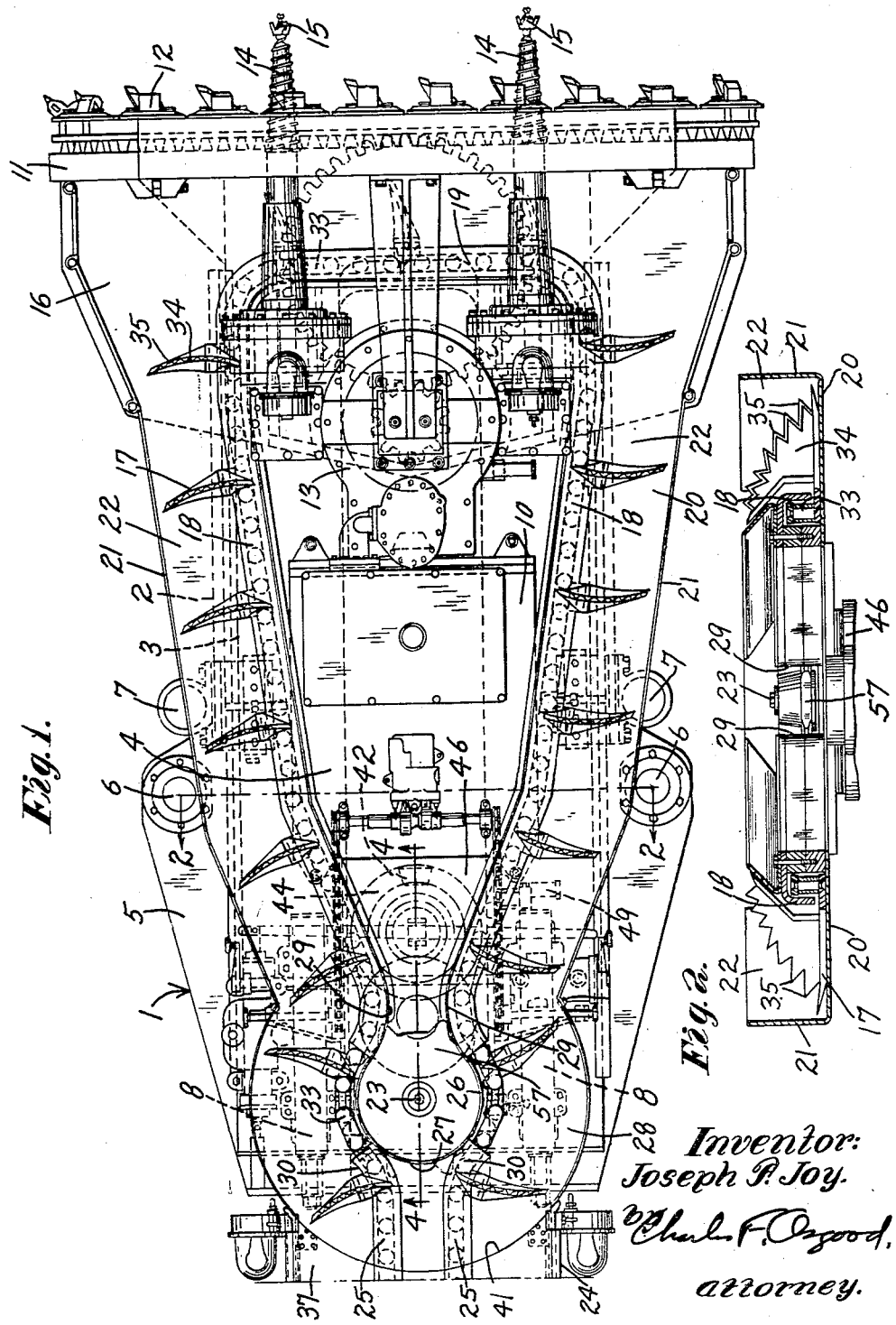

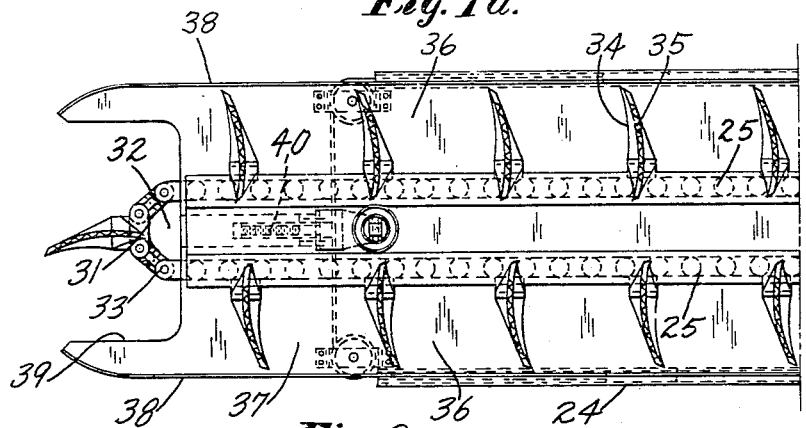
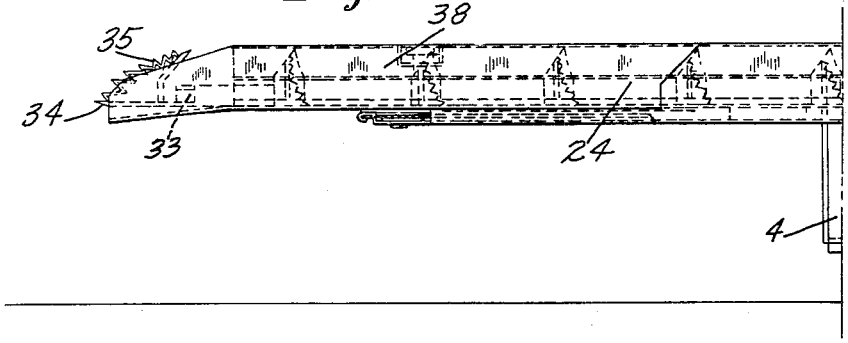
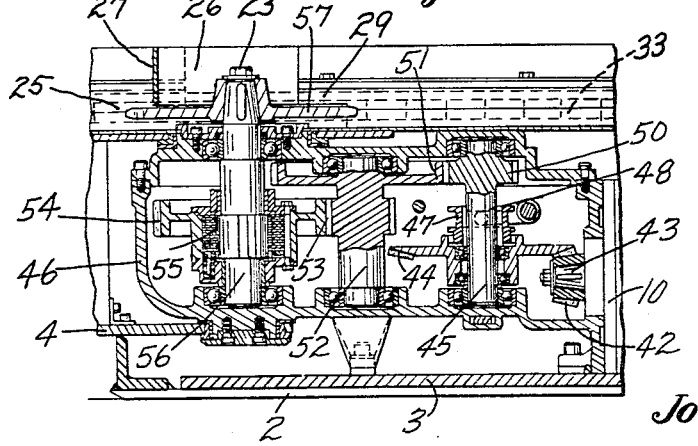

2,777,565

CONVEYOR MECHANISM FOR MINING APPARATUS

Joseph F. Joy, Pittsburgh, Pa., assignor to Joy Manufacturing Company, Pittsburgh, Pa., a corporation of Pennsylvania Application December 12, 1952, Serial No. 325,651, which is a division of application Serial No. 194,259, November 6, 1950. Divided and this application May 17, 1955, Serial No. 508,968

7 Claims. (Cl. 198—109)

This invention relates to a conveyor mechanism and more particularly, but not exclusively, to a conveyor mechanism especially designed for use with a mining apparatus.

An object of this invention is to provide an improved conveyor mechanism for a mining apparatus. Another object is to provide an improved conveyor mechanism having improved guiding and driving means for the endless conveyor element thereof. A further object is to provide an improved conveyor mechanism having an improved horizontally swingable rear discharge portion and improved driving and guiding means for the conveyor element arranged at the swivel of the rear discharge portion. A still further object is to provide an improved conveyor mechanism having improved driving means engaging an intermediate portion of the conveyor element at points spaced substantial distances from the remote end portions of the conveyor element. Yet another object is to provide improved conveyor mechanism having a rearward frame portion pivotally mounted for horizontal swinging movement with its pivot coaxial with its driving means and lying between opposite runs of the endless conveyor element at points spaced substantial distances from the remote end portions of the conveyor element. These and other objects and advantages of the invention will, however, hereinafter more fully appear in the course of the ensuing description and as more particularly pointed out in the appended claims.

This application is a division of my copending application Serial No. 325,651, filed December 12, 1952, now matured into Patent No. 2,737,287, dated March 6, 1956.

In the accompanying drawings there is shown for purposes of illustration one form which the invention may assume in practice.

In these drawings:

Figs. 1 and 1a, taken together, constitute a plan view of a preferred illustrative form of the improved conveyor mechanism.

Fig. 2 is an enlarged fragmentary cross section through the conveyor, taken on line 2—2 of Fig. 1.

Fig. 3 is a side elevational view of the horizontally swingable rear portion of the conveyor shown in Fig. 1a.

Fig. 4 is an enlarged fragmentary central longitudinal vertical section, taken on line 4—4 of Fig. 1, showing the conveyor drive.

The mining apparatus with which the present invention is associated is of the so-called "square face" loop cutter type and generally comprises a portable base structure generally designated 1, which may assume various known forms but which herein, for illustrative purposes, may be of the "walking" or creeper type. This creeper base includes a bottom skid or pan 2 having a smooth bottom surface adapted to rest upon and move over the floor of a mine. Mounted on this skid or pan for rectilinear movement longitudinally relative thereto is a bottom plate 3 of a main frame 4 of the apparatus. The bottom skid has lateral plate portions 5 which carry upright power jacks 6 engageable with the floor and roof, while mounted at the sides of the main frame 4 are upright power jacks 7 engageable with the mine floor. Carried by the main frame 4 are parallel longitudinally extending feeding, repositioning and retracting power jacks 8. These jacks 6, 7 and 8 may be operated in the manner fully disclosed in my copending application Serial No. 194,259, filed November 6, 1950, to walk the base in a step-by-step fashion over the mine floor. Evidently, under certain conditions, in lieu of the base of the creeper type, a base of the conventional wheel-mounted or crawler type may be employed.

The main frame 4 of the apparatus carries a conventional motor 10 (Figs. 1 and 4), and mounted on the forward portion of the main frame in a transverse upright position across the front of the apparatus is a rectangular, open-centered guide frame 11 providing a guideway in which an endless loop cutter chain 12 is guided for circulation in an orbital path. Also arranged on the main frame in advance of the motor is a gear housing 13 containing gearing for driving the cutter chain. The endless loop cutter chain 12 travels in a rectangular orbital path about the guide frame and as the apparatus is advanced by the creeper base during the mining operation the loop cutter chain cuts out a rectangular-shaped core of mineral from a solid mine vein and as cutting progresses the core of mineral is broken down or dislodged by a pair of wedge shaped mineral breaker devices or coal bursters 14 and associated penetrating drills 15. The dislodged or broken mineral falls rearwardly through the open center of the guide frame onto a horizontal receiving plate 16 and is received by an endless conveyor 17 guided for orbital circulation about and extending upwardly and rearwardly along the sides of the gear housing 13. Guideway-providing elements 18 and 19 extend along the sides of the forward portion of the main frame of the apparatus and partially across the horizontal receiving plate 16 and the endless conveyor is guided along the guideways of these elements. Bottom plates 20 having upright side plates 21 secured thereto cooperate to define troughlike passageways 22 extending upwardly from the top surface of the receiving plate 16 and rearwardly along the opposite sides of the main frame. Pivotally mounted at 23 on the rearward portion of the conveyor frame is a horizontally swingable rear discharge conveyor frame or discharge portion 24 having adjacent parallel guideway-providing portions 25 (Figs. 1 and 1a) spaced equidistantly from the longitudinal median line of the rear conveyor frame. Arranged coaxially with the pivot or swivel 23 is a curved vertical guide plate or arcuate guide 26 having a partially circular surface 27 and overlying a partially circular horizontal bottom plate portion 28 of the rearward portion of the forward conveyor frame. This curved guide plate 26 has oppositely curved, forwardly extending portions 29 which substantially join with the guideways of the members 18 and the forward portions of the guideway-providing members 25 have oppositely curved or outwardly bent portions 30 which substantially join with the opposite side surfaces of the curved guide plate 26. The guideway-providing portions 25 on the swingable rear conveyor frame 24 are joined at their rear ends by a semicircular guiding surface 31 (see Fig. 1a) formed on a guide block 32 adjustably mounted on the rear end of the swingable conveyor frame portion 24. The endless conveyor comprises a universal type drive chain 33 which is guided for orbital circulation along the guideways provided by the elements 18, 19, 26, 25 and 32, and secured to this chain at spaced intervals are laterally projecting, forwardly curved flights 34 formed with sharpened wear resisting teeth 35, and these flights are adapted to move within the troughlike passageways 22 of the forward conveyor frame and similar troughlike passageways 36 formed by a bottom plate 37 and integral upright side plates 38 of the rearward conveyor frame 24. The conveyor flights, as the conveyor is driven, move transversely over the forward portion of the horizontal plate 16 and engage the dislodged and disintegrated mineral which has fallen through the open center of the cutter frame 11 onto the horizontal receiving plate during the cutting and dislodging operation, and this front receiving portion of the conveyor moves the dislodged mineral laterally and then upwardly and rearwardly along one of the troughlike passageways 22 at one side of the front conveyor frame, rearwardly past the swivel 23 of the swingable rear conveyor frame 24 and then rearwardly along one of the troughlike passageways 36 at one side of the rear conveyor frame to discharge through a bottom opening 39 in the rearward end portion of the swingable rear conveyor frame, as the conveyor chain moves around the curved surface 31 of the rear guide block 32. The return run of the conveyor chain then travels forwardly along the troughlike passageway 36 at the opposite side of the rear conveyor chain, forwardly past the swivel 23, and then forwardly along the troughlike passageway 22 at the opposite side of the front end of the main frame and over the horizontal plate 16 into a position to again engage the dislodged and disintegrated mineral. An adjusting device 40 embodying a screw and nut (Fig. 1a) is arranged within the orbit of the conveyor as it travels along the guideways of the rear conveyor frame 24, and this device engages the guides block 32 to adjust the latter longitudinally relative to the rear conveyor frame, to vary the tension of the conveyor drive chain.

The bottom plate 37 of the rear conveyor frame is arcuately formed at 41 to fit closely against the curved edge of the rear plate 37, as shown in Fig. 1. The conveyor 17 is driven by the motor 10, and the conveyor driving means comprises a beveled gear 42 keyed to the rear end of the motor shaft 43 (Fig. 4) and meshing with a beveled gear 44 having its hub journaled on bearing supported by a vertical shaft 45. This shaft is suitably journaled in bearings supported within a gear housing 46 mounted on the main frame rearwardly of the motor 10. A conventional sliding tooth or gear clutch 47 serves to connect the bevel gear 44 to the shaft 45 and this clutch is engaged by a yoke 48 operated by connections including a hand lever 49 (Fig. 1) conveniently located exteriorly of the gear housing at one side of the main frame. Secured to the upper end of the shaft 45 is a spur gear 50 meshing with and driving a large spur gear 51 secured to the upper end of a vertical shaft 52. This shaft is arranged in parallelism with the shaft 45 and is likewise suitably journaled within the gear housing 46. Formed on the shaft 52 beneath the gear 51 is a spur gear 53 meshing with a large spur gear 54 which is connected by conventional friction disc slip clutch 55 to a parallel vertical shaft 56, the latter likewise suitably journaled within the gear housing 46. This friction clutch is set to slip at a predetermined overload thereby to prevent damage to the conveyor and its drive gearing in the event the load on the conveyor becomes excessive. The shaft 56 is arranged coaxially with the swivel 23 of the rear conveyor frame 24 and has keyed thereto at its upper end a chain sprocket 57 which engages and drives the conveyor chain 33. Thus, the conveyor chain may be driven and is properly guided with respect to the swivel of the rear conveyor frame in all angular positions of the rear conveyor frame with respect to the front conveyor frame. The curved rear ends of the guide members 18 and the curved front ends 30 of the guide members 25, together with the curved plate 26, serve to guide the conveyor chain with respect to the drive sprocket 57 as the conveyor chain passes the swivel 23 of the rear conveyor frame, in the manner clearly shown in Fig. 1.

As a result of this invention an improved conveyor mechanism is provided whereby mineral such as coal which is dislodged and disintegrated by the mining apparatus may be effectively conveyed away from the working face for delivery at a convenient point at the rear end of the apparatus. By the provision of the endless conveyor constructed and arranged in the manners disclosed, the conveyor is effectively guided and driven irrespective of the angular position of the discharge end portion of the conveyor. By locating the terminal driving element for the conveyor at the swivel of the swingable discharge end of the conveyor at a point spaced a substantial distance from the opposite end portions of the conveyor, the conveyor drive is greatly simplified, and by the provision of the novel guiding means for the conveyor arranged in adjacency to the swivel, the conveyor chain is at all times properly guided with respect to its driving element. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirt or the scope of the appended claims.

What I claim as new and desire to secure by Letters Patent is:

1. In a conveyor mechanism, a conveyor having a rearward discharge frame portion and a forward frame portion, an endless conveyor element guided for circulation along said frame portions, means for mounting said rearward frame portion for horizontal swinging movement about an upright axis, said axis lying between the opposite runs of said endless conveyor element within the orbit of said conveyor element at points spaced substantial distances from the remote end portions of said conveyor, driving means for said conveyor element comprising a terminal driving element coaxial with said swivel and drivingly engaging said opposite runs of said conveyor element, and guiding means coacting with said conveyor for maintaining the opposite runs of said conveyor element in driven engagement with said driving element in all angular positions of said rearward frame portion about its swivel axis.

2. In a conveyor mechanism, a conveyor having a rearward discharge frame portion and a forward frame portion, an endless conveyor element guided for circulation along said frame portions, means for mounting said rearward frame portion for horizontal swinging movement about an upright axis lying within the orbit of said conveyor element, said axis lying between the opposite runs of said endless conveyor element, driving means for said conveyor element comprising a terminal driving element coaxial with said swivel and drivingly engaging said opposite runs of said conveyor element, and guiding means including a curved guide partially encircling said terminal driving element and cooperating guiding elements on said conveyor frame portions for guiding the inner surfaces of said conveyor-runs as they pass into and away from their zones of engagement with said terminal driving element to maintain said opposite runs of said conveyor element at all times in proper guided relation with respect to said driving element as the latter passes said swivel axis of said rearward conveyor frame portion and irrespective of the angular position of the latter about its swivel axis.

3. In a conveyor mechanism, the combination comprising a front conveyor frame, a rear conveyor frame swivelly mounted to swing horizontally relative to said front frame, an endless conveyor guided for circulation relative to said frames with the pivotal axis lying within the chain orbit, guiding means at the remote ends of said frames for guiding the opposite end portions of said endless conveyor, said endless conveyor having opposite runs extending longitudinally along opposite sides of the swivel of said rear conveyor frame, said swivel located intermediate said guiding means and spaced substantial distances from the remote end portions of said conveyor, driving means for said conveyor including a terminal driving element coaxial with said swivel and drivingly engaging said opposite runs of said conveyor, and associated guiding means for maintaining said opposite runs of said conveyor in driven engagement with said driving element in all swiveled positions of said rear conveyor frame.

4. In a conveyor mechanism, the combination comprising a front conveyor frame, a rear conveyor frame swively mounted to swing horizontally relative to said front frame, an endless conveyor guided for circulation relative to said frames, guiding means at the remote ends of said frames for guiding said endless conveyor, said endless conveyor having opposite runs extending longitudinally along opposite sides of the swivel of said rear conveyor frame, said swivel located intermediate said guiding means and spaced substantial distances from the remote end portions of said conveyor, driving means for said conveyor including a terminal driving element coaxial with said swivel and drivingly engaging said opposite runs of said conveyor whereby said conveyor may be driven in all swiveled positions of said rear conveyor frame, said front frame having at its rear end a partially circular bottom plate having its curved peripheral edge struck on a radius extending from said swivel axis and said rear frame having at its forward portion a partially circular surface fitting closely to said curved edge of said plate, and an upstanding curved guide plate lying above said bottom plate and partially encircling said driving element for guiding said runs of said conveyor past said swivel and relative to said driving element irrespective of the angular position of said rear frame.

5. In a conveyor mechanism, the combination comprising relatively swingable conveyor frames one of which is swivelly mounted to swing laterally to the other, an endless conveyor element guided for orbital circulation relative to said conveyor frames with the swivel axis lying within the orbit of said conveyor element, guiding means at the remote ends of said conveyor frames for guiding said conveyor element during its orbital circulation, said conveyor element having opposite runs extending longitudinally along opposite sides of said swivel axis with the latter located intermediate said guiding means and spaced substantial distances from the remote end portions of said conveyor element, driving means for said conveyor element including a terminal driving element coaxial with said swivel and drivingly engaging said opposite runs of said conveyor element for driving the latter in all relatively swiveled positions of said conveyor frames, and guiding means including a partially circular, upstanding guide carried by one of said conveyor frames and partially encircling said driving element for guiding said opposite runs of said conveyor element as said runs move past said swivel, said guiding means maintaining said opposite runs of said conveyor element in driven engagement with said driving element irrespective of the relative angular positions of said conveyor frames about said swivel.

6. A conveyor mechanism as set forth in claim 5 wherein said guiding means also includes guides for said opposite runs of said conveyor element as said runs pass toward and from said driving element, said first mentioned partially circular, upstanding guide being disposed intermediate said guides and joining with the latter.

7. A conveyor mechanism as set forth in claim 5 wherein one of said conveyor frames has a partially circular bottom plate provided with a curved peripheral edge struck on the radius extending from said swivel axis and said other conveyor frame having a partially circular surface fitting closely to said curved edge of said plate and partially encircling said driving element, said upstanding partially circular guide lying above said bottom plate.

References Cited in the file of this patent
UNITED STATES PATENTS

| | | |
|---|---|---|
| 806,804 | Hamilton | Dec. 12, 1905 |
| 1,095,077 | Brown et al. | Apr. 28, 1914 |
| 1,757,453 | Douglass et al. | May 6, 1930 |